April 9, 1929.　　B. E. GETCHELL　　1,708,222
ELECTRIC RELAY
Filed May 2, 1927　　2 Sheets-Sheet 1
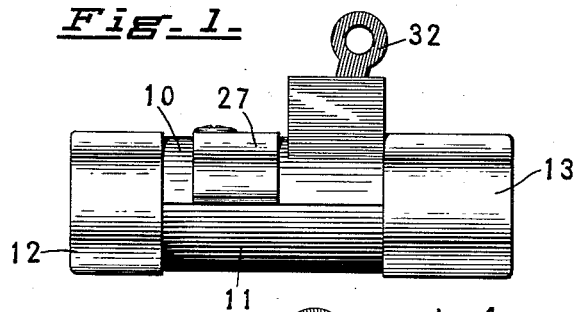
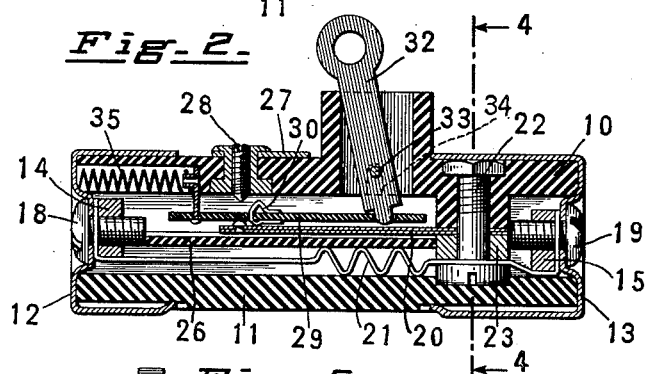
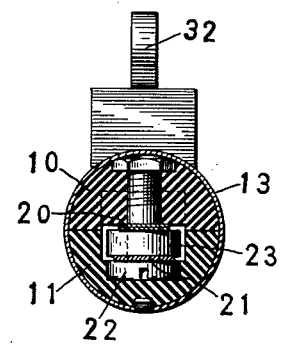
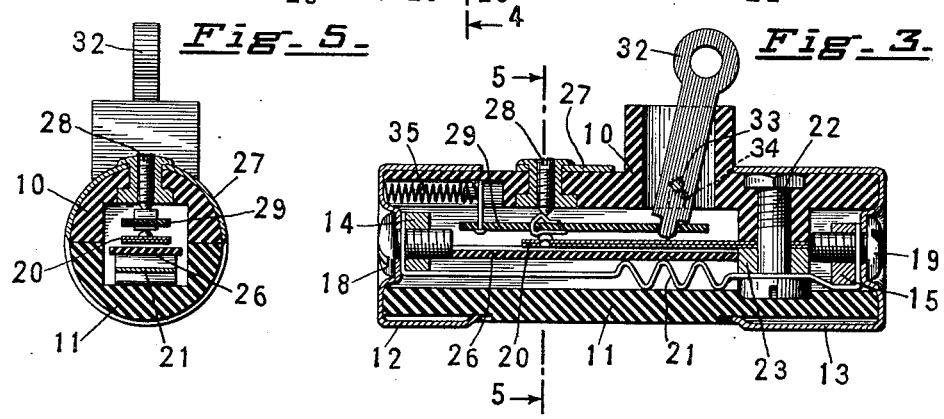
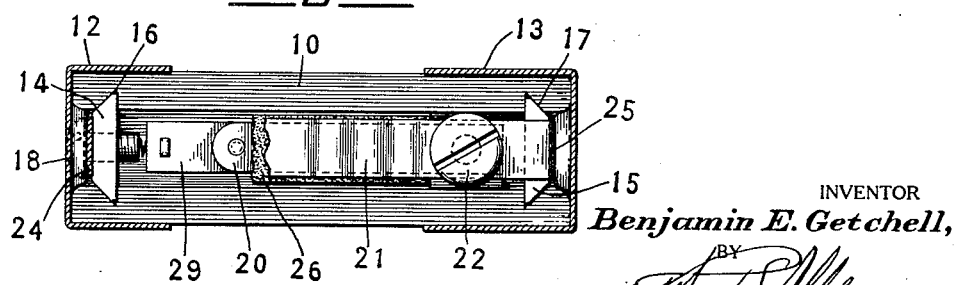
INVENTOR
*Benjamin E. Getchell,*
BY
ATTORNEY April 9, 1929.  B. E. GETCHELL  1,708,222
ELECTRIC RELAY
Filed May 2, 1927  2 Sheets-Sheet 2
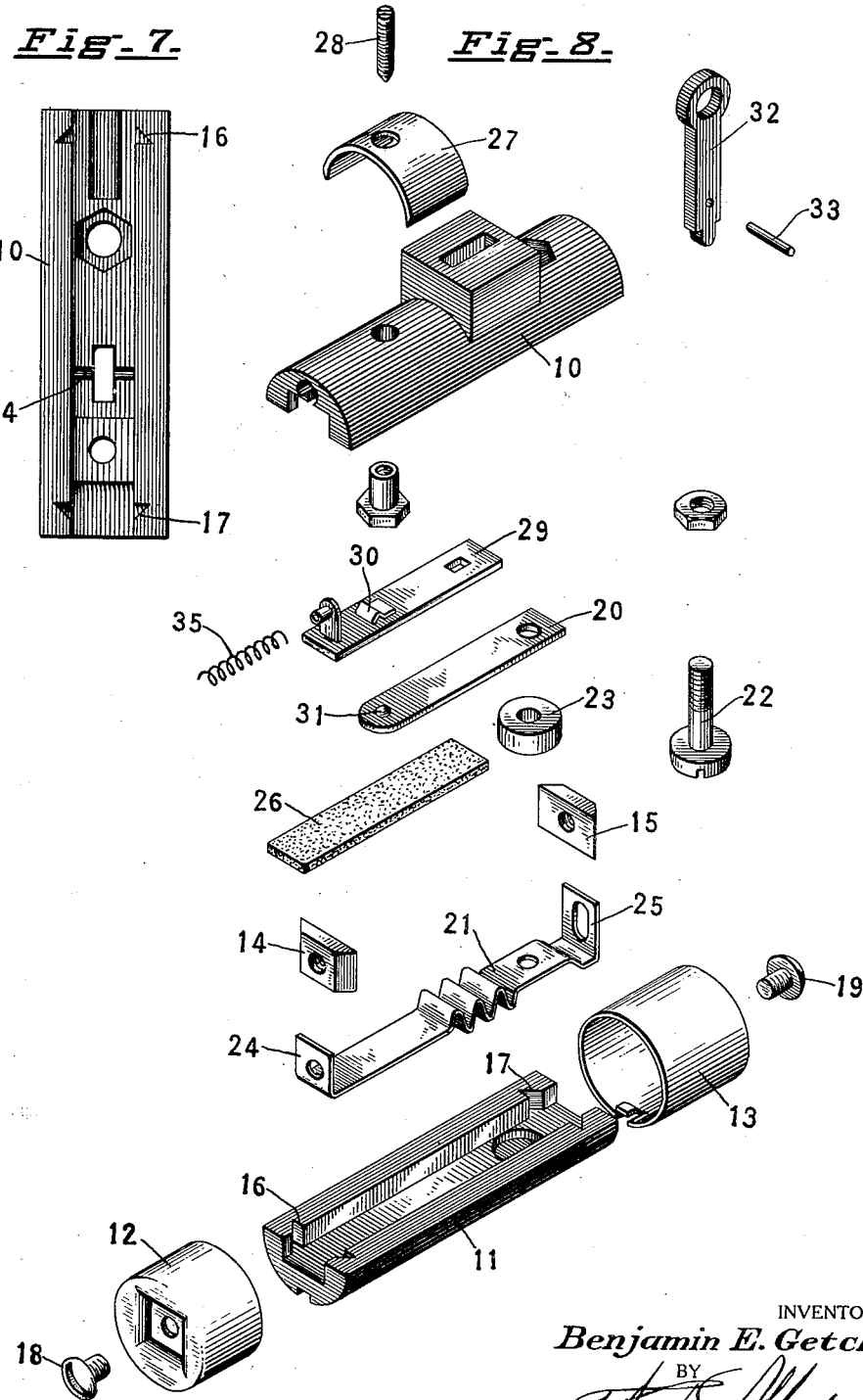

Patented Apr. 9, 1929.

1,708,222

UNITED STATES PATENT OFFICE.

BENJAMIN E. GETCHELL, OF PLAINVILLE, CONNECTICUT, ASSIGNOR TO THE TRUMBULL ELECTRIC MANUFACTURING COMPANY, OF PLAINVILLE, CONNECTICUT, A CORPORATION OF CONNECTICUT.

ELECTRIC RELAY.

Application filed May 2, 1927. Serial No. 188,244.

My invention relates to improvements in protecting devices for motor circuits and is intended to automatically open the circuit in case of a dangerous continued overload. It particularly relates to the protection of such motor installations as are provided with automatic means for operating a motor switch under certain working conditions.

My former Patents 1,569,364, 1,569,803, and 1,569,804, dated January 12, 1926, and 1,581,192, dated April 20, 1927, show thermostatic relays intended for the protection of motor circuits.

These former devices, however, are of the automatically re-setting or self-restoring type in which, on overload conditions, the thermostat of the relay opens the circuit through a cooperating magnetically controlled switch but, after such operation, the thermostat soon cools and again closes the contacts of the relay and would again close the motor circuit except for the fact that the main switch is of a type which must be closed by manual action.

My present invention contemplates a relay construction especially adapted for controlling installations of that class in which it is not desirable to have the circuit closed automatically and in which my aforementioned devices could not be used in a practical manner because of their self-restoring feature.

Some installations include, for instance, motor driven apparatus for pumping air, gas or liquids and are so arranged that the motor-controlling switch is automatically operated at the beginning and the end of a cycle of work by means of a float switch, a thermostat or other equivalent means. In such installations there has been no provision for opening the motor switch between the cycles of work and therefore no protection against overload.

The motor switch operating means have previously operated to throw the switch on or off at the predetermined time regardless of the electrical condition of the circuit or of the motor. In some cases there is a considerable lapse of time between the cycles of operation and it will readily be seen that in case of overload, considerable damage might be done to the motor or apparatus before the next automatic operation of the switch.

Because of the automatic operation of such installations, they are usually unattended and receive but scant attention while operating normally, therefore it is vitally necessary that means for protection against overload be provided and that this means should positively open the motor circuit on overload in such a way that the circuit cannot again be closed until the protective device has been operated deliberately and manually thus assuring the attention of a presumably competent person.

One object of my invention, therefore, is to provide a relay in which the circuit will be opened promptly in response to overload conditions in the circuit, or abnormal conditions in the motor, and, yet, when the circuit is once open, it will remain open until the relay is intentionally reset.

Another object is to provide a relay construction in which the circuit is opened with a snap action.

Another object is to provide a thermostatic relay having a double break switch movement together with means for interposing an insulating barrier between the contacts when the circuit is opened.

Another object is to provide a thermostatic relay having spring pressed switch members frictionally held in the on position.

Another object is to provide simple and convenient external means for resetting a thermostatic relay.

Another object is to provide means for manually opening the circuit of a thermostatic relay.

Another object is to provide a manually resettable thermostatic relay of such dimensions and character that it may be used interchangeably with relays or fuses of standard dimensions.

Another object is to provide a relay with a thermostatic element and a movable contact normally held in the on position by spring pressure, but in which the thermostatic element is adapted to warp or bend and release the movable contact under predetermined abnormal conditions.

Another object is to provide a manually resettable overload relay that cannot be held closed against an overload either intentionally or accidentally.

In the present embodiment herein shown and described the invention contemplates a thermostatic element and a heater strip mounted, as set forth in my former patents, but provided with a movable switch member interposed between the stationary contact and the thermostatic element when the circuit is closed. This switch member has an insulating portion adapted to be interposed between the two contacts by the action of a separate spring when the thermostatic element warps sufficiently to release it.

Fig. 1 is a side view of a relay embodying one form of the improvements of my invention.

Fig. 2 is a longitudinal sectional view on a somewhat larger scale showing the parts in an open circuit position.

Fig. 3 is a similar sectional view showing the parts in the closed circuit position.

Fig. 4 is a transverse sectional view on the plane of the line 4—4 of Fig. 2.

Fig. 5 is a transverse sectional view on the plane of the line 5—5 of Fig. 3.

Fig. 6 is a longitudinal sectional view looking upwardly at the upper part of the housing in Fig. 3.

Fig. 7 is a plan view of the lower part of the housing.

Fig. 8 is an exploded perspective view showing various parts of the relay.

The housing is preferably formed of insulating material having the upper part 10 and the lower part 11. These parts are held together by the end caps 12 and 13. Anchor members 14 and 15 are seated in grooves 16 and 17 in two parts of the housing. The screws 18 and 19 pass through the ends of the caps and screw into these anchors 14 and 15.

The bi-metallic thermostatic element 20 and the heater strip 21 are secured to the upper part of the housing by a bolt 22. Preferably they are separated by a disc 23 having a predetermined rate of thermal conductivity. The ends 24 and 25 of the heater strip are bent at substantially right angles and interposed between the anchor members and the end caps so that the main circuit passes from one end cap and through the heater strip to the other end cap. The strip 26 of insulating material, such as asbestos, is interposed between the main part of the heater strip and the thermostatic element.

The auxiliary circuit enters the relay through the external contact 27 and the contact screw 28. This screw is adjustable but may be sealed as set forth in my Patent 1,569,364. The insulating slide 29 is mounted in the groove of the upper housing part and has a contact member 30 which extends from one side through to the other as shown in Figs. 2 and 3.

The thermostatic element 20 is preferably provided with a contact boss 31 which engages one side of the contact 30 while the point of the contact screw 28 engages the other, as shown in Fig. 3. The lever 32 mounted on the pin 33 in the slot 34 serves to permit the manual operation of the slide 29 to open or close the circuit. The spring 35 presses against the slide 29, or a projection from it, so as to tend to press the slide and its contacts 30 to the open circuit position, as shown in Fig. 2. In order to prevent the switch slide 29 from being accidentally vibrated out of position, I may provide a slight incline or shoulder on one side of the contact 30 as shown in Fig. 2 or on both sides as shown in Fig. 3. Preferably there will be an incline on the side next the boss 31.

It will be understood, of course, that the thermostatic member 20 tends to press upwardly so as to hold the parts frictionally or yieldingly in the closed circuit or on position shown in Fig. 3. When the thermostatic member warps or bends due to the heat transmitted through the washer or disc 23, the spring 35 overcomes the friction of the contact 30 between the contact 28 and the boss 31 and opens the circuit with a snap action, thus, interposing a part of the insulating strip 29 between the contact screw 28 and the contact boss 31 of the thermostatic element. It is thus impossible for the thermostatic element alone to again close the circuit. Obviously, however, the circuit may be very easily closed by movement of the lever 32 from the position of Fig. 2 to that of Fig. 3.

The foregoing construction has a distinct advantage over ordinary resetting relays since it is impossible to keep the circuit closed with my improved device under overload conditions. Even though the lever 32 be deliberately or accidentally held in the position of Fig. 3, the thermostat will periodically automatically open and close the circuit, thus interfering with the proper functioning of the motor control by the relay and calling attention to the irregular condition of the apparatus.

It should be understood that the construction shown is that preferred for certain and special purposes. However, I do not consider the invention limited to the particular details disclosed except so far as they be required by the terms of the claims or the condition of the prior art.

I claim:

1. A relay comprising an adjustable contact and a thermally operable member normally pressed toward said adjustable contact in combination with an insulating member fully interposed in all of its positions and movable between said contact and said thermally operable member, a conducting member carried by said insulating member adapted to connect said contact to said thermally operable member, a spring for moving said insulating member in one direction to open the circuit, and manually operable means for resetting said insulating member.

2. A relay construction including an insulating casing, a movable switch member in said casing, said member comprising an insulating plate having an electrical connector mounted therein, a spring for moving said switch member to off position, a bi-metallic thermostatic element co-related with said switch member and adapted to hold said member in on position in opposition to said spring under normal circuit conditions and to bend to releases said member on overloaded circuit conditions and an externally accessible lever having operable connection with said switch member.

3. A relay construction including an adjustable contact, a thermally operable member normally pressing toward said contact, a movable insulating member interposed in all of its positions between said contact and said thermally operable member, a conducting member carried by said insulating member adapted, in one of its operative positions to complete the circuit between said contact and said thermally operable member, a spring for moving said insulating member to open the circuit and manually operable means for moving said insulating member.

4. A relay including an adjustable contact and a thermally operable member normally pressed toward said adjustable contact in combination with a sliding member movable between said contact and said thermally operable member and a conducting member carried by said sliding member adapted in one of its positions to electrically connect said contact with said thermally operable member, said sliding member having an insulating part interposed between the adjustable contact and the thermally operable member when the circuit is open.

5. A relay including a relatively stationary contact, a thermally operable member adjacent thereto, a movable insulating member between the said contact and said thermally operable member, a conducting connector carried by said insulating member and normally held frictionally, a spring for moving said switch member when released by said thermally operable member and a resetting lever connected to said insulating member.

6. A relay construction including a relatively stationary contact, a movable insulating member, an electrical connector carried by said member, a spring for moving said insulating member to off position and a bi-metallic thermostatic element adapted to hold said insulating member and said connector in on position in opposition to said spring on normal circuit conditions and to bend so as to release said insulating member on overloaded circuit conditions.

7. A relay construction including a casing, a relatively stationary contact and a thermostatic contact within said casing, a movable switch member comprising an insulating plate having an electrical connector mounted thereon and adapted to co-act with said contacts and a pivoted lever having one of its ends extending outside of said casing and its other end having operable connection with said movable switch member.

8. A relay construction including an insulating casing, a stationary contact secured to said casing, a bi-metallic thermostatic element mounted within said casing, an insulating slide interposed and movable between said stationary contact and said thermostatic element, a contact member carried by said insulating slide and adapted, in one position, to complete an electrical connection between said stationary contact and said thermostatic element and a spring for moving said insulating slide in one direction, said thermostatic element normally clamping the contact carried by said insulating slide against said stationary contact in opposition to said spring.

BENJAMIN E. GETCHELL.